United States Patent
Moss et al.

(10) Patent No.: US 9,938,819 B2
(45) Date of Patent: Apr. 10, 2018

(54) REDUCING OR PREVENTING DISSIPATION OF ELECTRICAL CURRENT AND ASSOCIATED MAGNETIC SIGNAL IN A WELLBORE

(71) Applicant: Applied Technologies Associates, Inc., Paso Robles, CA (US)

(72) Inventors: Clinton Moss, Edmonton (CA); Douglas Ridgway, Edmonton (CA); Troy Martin, Edmonton (CA)

(73) Assignee: APPLIED TECHNOLOGIES ASSOCIATES, INC., Paso Robles, CA (US)

( * ) Notice: Subject to any disclaimer, the term of this patent is extended or adjusted under 35 U.S.C. 154(b) by 22 days.

(21) Appl. No.: 15/086,136

(22) Filed: Mar. 31, 2016

(65) Prior Publication Data

US 2016/0208598 A1    Jul. 21, 2016

Related U.S. Application Data

(63) Continuation-in-part of application No. 14/884,414, filed on Oct. 15, 2015.
(Continued)

(51) Int. Cl.
*G01V 3/00* (2006.01)
*E21B 47/024* (2006.01)
(Continued)

(52) U.S. Cl.
CPC .............. *E21B 47/024* (2013.01); *E21B 7/04* (2013.01); *E21B 47/02216* (2013.01);
(Continued)

(58) Field of Classification Search
CPC ... G01V 3/18; G01V 3/20; G01V 3/26; G01V 3/02; G01V 3/08; G01V 3/081;
(Continued)

(56) References Cited

U.S. PATENT DOCUMENTS 2,981,788 A   4/1961 Bunish
4,593,770 A   6/1986 Hoehn
(Continued)

FOREIGN PATENT DOCUMENTS

WO    2014089402 A2    6/2014

OTHER PUBLICATIONS

International Search Report and Written Opinion issued in International Application No. PCT/US16/25110, dated Jun. 24, 2016 (10 pages).

*Primary Examiner* — Raul Rios Russo
(74) *Attorney, Agent, or Firm* — Adolph Locklar

(57) ABSTRACT

An artificial toolface reference system includes a power supply providing current to a ground lead and a reference lead. A ground point is coupled to the ground lead and in electrical connection with the ground. A reference wellbore includes a reference conductor in electrical connection with the ground. The reference conductor is in electrical connection with the reference lead. The reference conductor includes an uninsulated portion and an insulated portion having an insulating layer positioned thereabout. A guidance sensor positioned outside the reference wellbore includes at least one magnetometer. The power supply may be used to provide a current through the reference conductor, into the ground through the uninsulated portion, and the ground point such that a reference magnetic field is generated along the reference conductor. The guidance sensor may measure the reference magnetic field with a magnetometer. An artificial magnetic toolface may be calculated therefrom.

33 Claims, 2 Drawing Sheets

Related U.S. Application Data

(60) Provisional application No. 62/141,636, filed on Apr. 1, 2015, provisional application No. 62/065,363, filed on Oct. 17, 2014.

(51) Int. Cl.
| | |
|---|---|
| *G01V 3/26* | (2006.01) |
| *E21B 7/04* | (2006.01) |
| *G01V 3/20* | (2006.01) |
| *G01V 3/18* | (2006.01) |
| *G01V 3/28* | (2006.01) |
| *E21B 47/022* | (2012.01) |
| *G01V 3/15* | (2006.01) |
| *G01V 3/16* | (2006.01) |

(52) U.S. Cl.
CPC ............... *G01V 3/18* (2013.01); *G01V 3/20* (2013.01); *G01V 3/26* (2013.01); *G01V 3/28* (2013.01); *G01V 3/15* (2013.01); *G01V 3/16* (2013.01)

(58) Field of Classification Search
CPC . G01V 3/082; G01V 3/28; G01V 3/15; G01V 3/16; G01V 3/165
USPC ....... 324/303, 323, 331, 333, 338, 345, 346, 324/351, 376
See application file for complete search history.

(56) References Cited

U.S. PATENT DOCUMENTS

| | | |
|---|---|---|
| 5,676,212 A | 10/1997 | Kuckes |
| 7,568,532 B2 | 8/2009 | Kuckes et al. |
| 2007/0126426 A1* | 6/2007 | Clark ............... E21B 47/02216 324/326 |
| 2012/0061143 A1 | 3/2012 | Hay |
| 2013/0341092 A1* | 12/2013 | Hay .................. E21B 7/04 175/24 |
| 2016/0103240 A1* | 4/2016 | Wu .................... G01V 3/081 324/346 |
| 2016/0273337 A1* | 9/2016 | Donderici ......... E21B 47/02216 |

* cited by examiner

REDUCING OR PREVENTING DISSIPATION OF ELECTRICAL CURRENT AND ASSOCIATED MAGNETIC SIGNAL IN A WELLBORE

CROSS-REFERENCE TO RELATED APPLICATIONS

This application is a continuation in part of U.S. application Ser. No. 14/884,414, filed Oct. 15 2015, which itself a nonprovisional application which claims priority from U.S. provisional application No. 62/065,363, filed Oct. 17, 2014. This application also claims priority from U.S. provisional application No. 62/141,636, filed Apr. 1, 2015. The entirety of each of these applications is hereby incorporated by reference.

TECHNICAL FIELD

Field of the Disclosure

The present disclosure relates generally to borehole location systems, and specifically to use of magnetic fields for determination of position of a subsurface wellbore.

Background of the Disclosure

Knowledge of wellbore placement and surveying is useful for the development of subsurface oil & gas deposits. Directional borehole drilling typically relies on one or more directional devices such as bent subs and rotary steering systems to direct the course of the wellbore. The angle between the reference direction of the directional device and an external reference direction is referred to as the toolface angle, and determines the direction of deviation of the wellbore. Directional drilling proceeds through comparing the placement of the borehole with the desired path, and selecting a toolface angle and other drilling parameters to advance the borehole and correct it towards the planned path. Measurement of toolface thus may be a component for borehole steering and placement.

When determining toolface, an external reference direction for the toolface may be chosen based on the geometry and location of the wellbore. In deviated wellbores, with an inclination away from vertical in excess of 5-8°, the usual reference is the direction of acceleration due to gravity. This may be measurable via accelerometers which rotate with the drill string, such as during measurement while drilling (MWD). In a vertical well or near-vertical well, the direction of gravity may be aligned or substantially aligned with the drill string axis and may not be able to provide a useful reference direction. Several alternatives may be used in place of accelerometers in vertical or near-vertical wells. Traditionally, magnetic toolface may be used, which applies the onboard magnetometers used in MWD to use the Earth's magnetic field as a reference direction. However, magnetic toolface may fail at sufficiently high magnetic latitude, or where magnetic interference from nearby wellbores, surface facilities, or other effects alter the local magnetic field. Another alternative for a reference is the true North available from a north-seeking downhole gyroscope, or a reference carried down by a non-north-seeking gyroscope. Gyroscopes may suffer from cost and reliability concerns.

SUMMARY

The present disclosure provides for an artificial toolface reference system. The artificial toolface system may include a power supply providing current to a ground lead and a reference lead. The artificial toolface system may include a ground point coupled to the ground lead and in electrical connection with the ground. The artificial toolface system may include a reference wellbore. The artificial toolface system may include a reference conductor positioned within the reference wellbore. The reference conductor may be in electrical connection with the reference lead. The reference conductor may have an insulated portion and an uninsulated portion. The uninsulated portion may be in electrical connection with the ground. The insulated portion may have an insulating layer positioned thereabout. The artificial toolface system may include a guidance sensor positioned outside the reference wellbore including at least one magnetometer.

The present disclosure also provides for a method. The method may include forming a reference conductor. The reference conductor may have an insulated portion and an uninsulated portion. The insulated portion may have an insulating layer positioned thereabout. The method may include positioning the reference conductor in a reference wellbore such that the uninsulated portion of the reference conductor is in electrical connection with the ground. The method may include coupling a power supply between a ground point and the reference conductor. The ground point may be positioned a distance away from the reference conductor and may be in electrical communication with the ground. The method may include providing a current, with the power supply, through the reference conductor, the ground, and the ground point such that a reference magnetic field is generated along the reference conductor. The method may include measuring the reference magnetic field with a magnetometer positioned outside of the reference wellbore.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
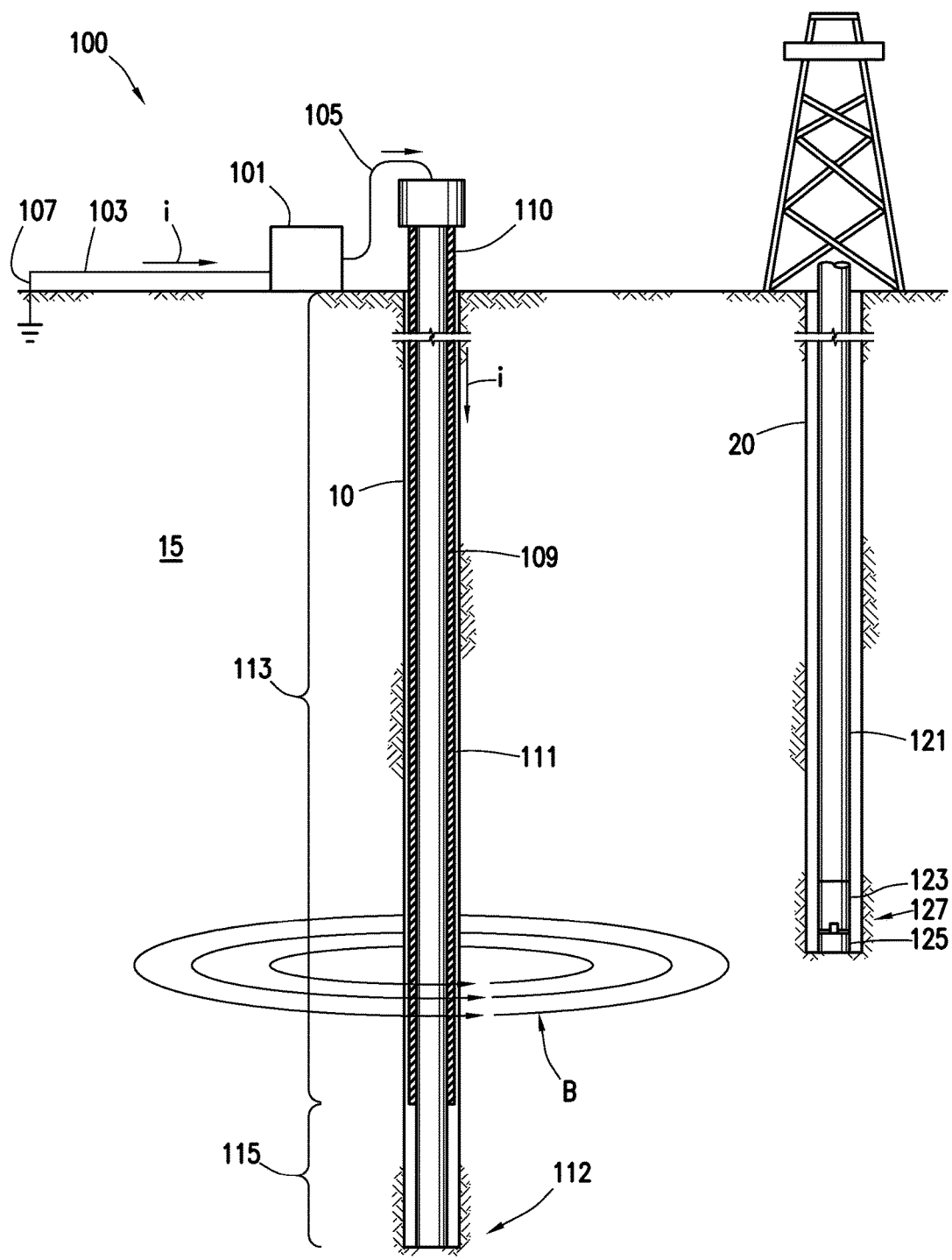
FIG. 1 depicts an artificial toolface reference system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
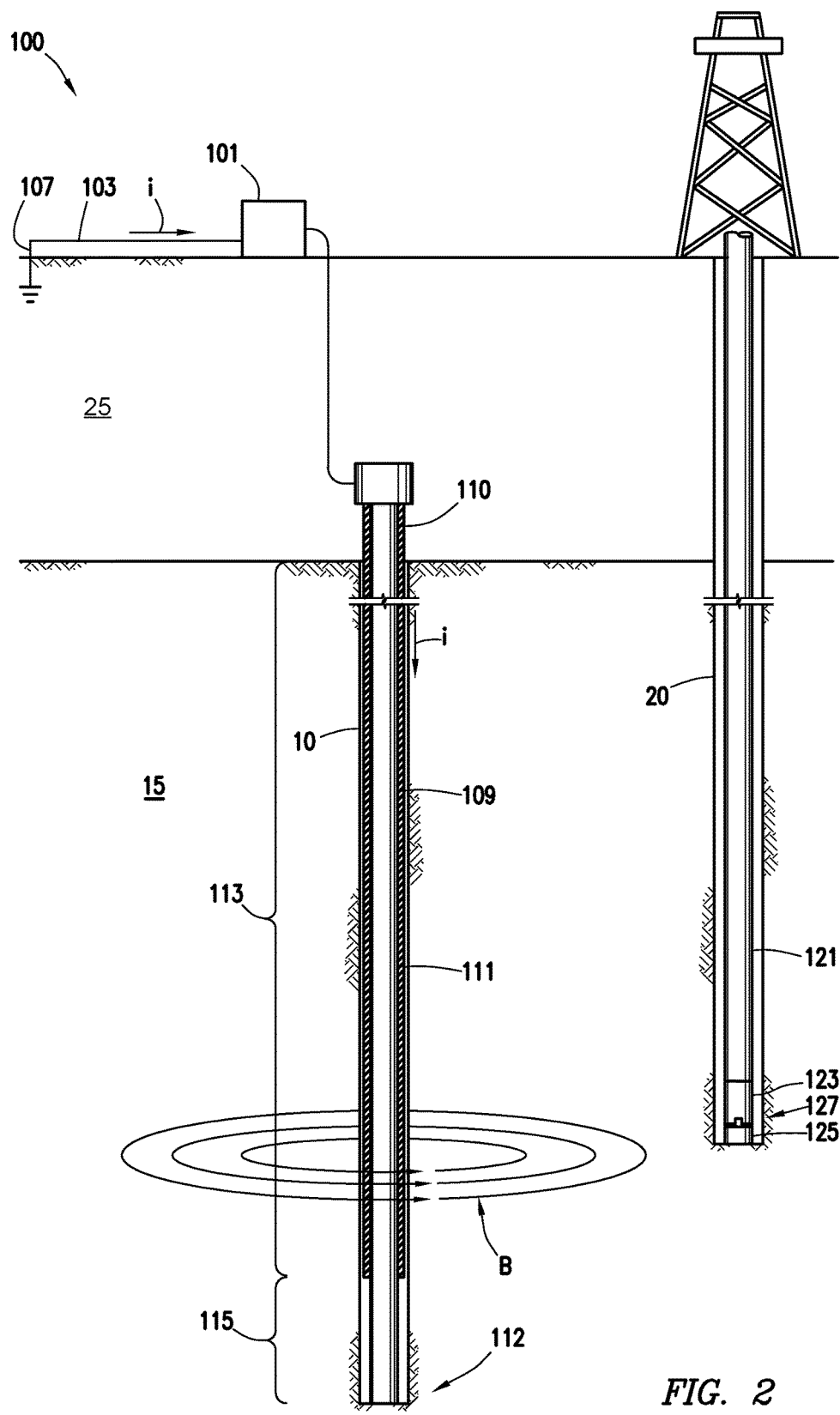
FIG. 2 depicts an artificial toolface reference system consistent with at least one embodiment of the present disclosure in a subsea application.

FIGS. 1 and 2 depict embodiments of artificial toolface reference system 100. Artificial toolface reference system 100 may include power supply 101. Power supply 101 may be any device capable of providing an electrical current as described herein, and may constitute a current supply or voltage supply as understood in the art. Power supply 101 may be in electrical connection between ground lead 103 and reference lead 105. Ground lead 103 may be in electrical connection to grounding point. Reference lead 105 may be in electrical connection to reference conductor 109 positioned in reference wellbore 10. Reference conductor 109 may be any conductor positioned within reference wellbore 10. Reference conductor 109 may be any conductor or combination of conductors axially aligned with reference wellbore 10. For example and without limitation, reference conductor 109 may be a length or string of tubing or casing, liner, drill pipe, drill collars, pup joints, production tubing, or wireline. In some embodiments, reference conductor 109 may be a drill stem or other length of drill string positioned in reference wellbore 10 including a fish or other downhole tool. In some embodiments, reference lead 105 may electrically couple to reference conductor 109 at an upper end 110 of reference conductor 109 at or near the surface of the ground 15. In some embodiments, reference conductor 109 may be a wire or cable positioned in reference wellbore 10 for communication with or providing power to a piece of downhole equipment. For example, in some embodiments, reference conductor 109 may be a wire for a downhole pump (not shown) positioned in reference wellbore 10. As understood in the art, one or more additional wires may be included in the wire for the downhole pump, which may be used as described herein. Although reference lead 105 is depicted as coupling to reference conductor 109 at the surface of ground 15, in some embodiments, reference lead 105 may be positioned within reference conductor 109 to make electrical contact with reference conductor 109 along its length within reference wellbore 10. For example, in some embodiments, a single wire (not shown) may be extended through reference conductor 109 and may make electrical contact therewith at a point on reference conductor 109 away from the surface of ground 15. In some embodiments, the wire may contact reference conductor 109 by gravity at, for example and without limitation, a deviation in the direction of reference conductor 109. In some embodiments, the wire may be coupled to a centralizer or other device having one or more conductive extensions such as bow springs to contact reference conductor 109. In some embodiments, the wire may be electrically coupled to reference conductor 109 through a conductive fluid within reference conductor 109.

In some embodiments, insulating layer 111 may be positioned about reference conductor 109. Insulating layer 111 may, for example and without limitation, electrically insulate an outer surface of reference conductor 109 from reference wellbore 10 and thus from ground 15. In some embodiments, insulating layer 111 may extend over a portion of reference conductor 109, referred to herein as insulated portion 113. In some embodiments, a portion of reference conductor 109, referred to herein as uninsulated portion 115, may be uninsulated and at least partially not covered by insulating layer 111. In some embodiments, uninsulated portion 115 may be positioned at lower end 112 of reference conductor 109, defined herein as being the furthest end of reference conductor 109 from the surface of ground 15. In some embodiments, insulating layer may extend from the surface of ground 15 to uninsulated portion 115. In some embodiments, insulating layer 111 may be positioned on reference conductor 109 to align with, for example and without limitation, formation zones along reference wellbore 10 having high conductivity. For example and without limitation, such a high conductivity zone may include a water-bearing sand formation.

Insulating layer 111 may be formed from any electrically insulating material. For the purposes of this disclosure, an electrically insulating material is a material which does not substantially conduct electricity as understood in the art. In some embodiments, insulating layer 111 may be applied in the form of a coating to an exterior surface of reference conductor 109. In some embodiments, insulating layer 111 may be applied individually to one or more tubulars which make up reference conductor 109 in embodiments in which reference conductor 109 is a tubular string. In some such embodiments, the joint between adjacent tubulars may be continuously or discontinuously insulated when the adjacent tubulars are joined. In some embodiments, insulating layer 111 may be adhered to reference conductor 109 or may be a covering which is not adhered to reference conductor 109.

In some embodiments, for example and without limitation, insulating layer 111 may be applied by spraying, brushing, dipping, electrostatic deposition, wrapping, casting, extruding, or any other suitable method as understood in the art depending on the makeup of insulating layer 111.

For example and without limitation, cold spraying and thermal spraying may be utilized. In some such embodiments, insulating layer 111 may be sprayed in the form of a fluid or foam onto reference conductor 109. In some embodiments, reference conductor 109 may be rotated and moved past one or more fixed spraying orifices. In some embodiments, the electrically insulating material of insulating layer 111 may be a single or plural component fluid or foam, whereby the respective parts chemically combine into finished form once dispensed from the spray application system. In some embodiments, the rate of curing of insulating layer 111 may be modified through the use of varying temperatures, types and amounts of catalysts, or as otherwise known in the art.

In some embodiments, the spraying operation may include, for example and without limitation, detonation spraying, flame spraying (powder or wire), high-velocity liquid fuel spraying, high-velocity air fuel spraying, high-velocity oxygen fuel spraying, plasma spraying, and arc spraying. In some embodiments, the electrically insulating material of insulating layer 111 may be in the form of a particulate thermosetting powder which fuses to a heated exterior of reference conductor 109. In some embodiments, insulating layer 111 may be extruded onto reference conductor 109.

In some embodiments, insulating layer 111 may be applied to reference conductor 109 by brush application. In some embodiments, reference conductor 109 may be dipped in a bath of the insulating material. In some such embodiments, reference conductor 109 may be passed through a sizing die to establish the desired thickness of insulating layer 111 as understood in the art. In some embodiments, where electrostatic deposition is utilized, the insulating material of insulating layer 111 may be formed from electrostatically charged particles which may be ejected or sprayed towards reference conductor, and accelerated by an electrostatic charge placed thereon.

In some embodiments, the thickness of insulating layer 111 may be selected based on the type of reference conductor 109 to be insulated, the insulating material used, and anticipated wellbore conditions.

In some embodiments, insulating layer 111 may be formed from a plastic or other polymer, such as, for example and without limitation, acrylonitrate butadiene styrene (ABS), an acetate, an acrylic, an acetyl resin, polyamide film, fluoropolymer, polycarbonate, aromatic polyamide, nylon, polyethylene terephthalate, phenolic, epoxy, polyester, polyolefin, polystyrene, polyurethane, polyvinylchloride, polytetrafluoroethylene, thermoplastic, polysulfone, polyetherimide, polyamide-imide, polyphenylene or combinations thereof. In some embodiments, insulating layer 111 may be formed from a composite material such as fiberglass material. In some such embodiments, the fiber reinforcement may be in the form of a fiber tape, fill, or sheeting. In some embodiments, insulating layer 111 may be formed from a rubber including, for example and without limitation, neoprene rubber or silicone rubber. In some embodiments, insulating layer 111 may be formed from a foam. In some embodiments, insulating layer 111 may be formed from varnish. In some embodiments, insulating layer 111 may be formed from a ceramic or mineral, such as mica. One having ordinary skill in the art with the benefit of this disclosure will understand that insulating layer 111 may be formed from one or more of the above listed materials without deviating from the scope of this disclosure. Additionally, one having ordinary skill in the art with the benefit of this disclosure will understand that insulating layer 111 may be formed from different materials and/or by different methods at different points along insulated portion 113 without deviating from the scope of this disclosure.

Grounding point 107 may be in electrical connection with the surrounding ground 15 or, in a subsea application as depicted in FIG. 2, may be in electrical connection to seawater 25 which may provide an electrical connection with ground 15. In some such embodiments, ground lead 103 may extend to ground 15. Grounding point 107 may include, for example and without limitation, one or more grounding stakes driven into ground 15 or conductors in electrical contact with seawater 25. In some embodiments, grounding point 107 may be an existing casing or well. In some embodiments, grounding point 107 may be positioned at a distance from reference wellbore 10. In some embodiments, grounding point 107 may be any other electrical ground including, without limitation, culverts, gates, or other structures.

In some embodiments, reference conductor 109 may be electrically conductive, such that current i travels from power supply 101 through reference lead 105 into reference conductor 109. Because reference conductor 109 is conductive, current flows through reference conductor 109. Insulating layer 111 may prevent or reduce flow of current i from reference conductor 109 to ground 15 across insulated portion 113. Current i may travel through uninsulated portion 115 into ground 15, through which current i propagates to grounding point 107 to return to power supply 101 through ground lead 103. Insulating layer 111 may thus prevent or reduce current leakage along insulated portion 113. In some embodiments, grounding point 107 may be positioned a sufficient distance from reference wellbore 10 such that current i leaves reference conductor 109, without being bound by theory, in a substantially isotropic manner according to Ohm's law.

As current i flows through reference conductor 109, reference magnetic field B is generated thereby, without being bound by theory, according to Ampere's law. Reference magnetic field B extends along the length of reference conductor 109 and is in a plane orthogonal to the flow of current i. As further discussed herein below, the magnitude of reference magnetic field B at a given point along reference conductor 109 is proportional to the magnitude of current i at the point. Preventing or reducing current leakage along insulated portion 113 may, for example and without limitation or limitation to theory, allow a higher magnitude reference magnetic field B to be generated along a longer portion of reference conductor 109 than would be generated with an uninsulated reference conductor 109, as a larger amount of current i travels the length of reference conductor 109. Current i may exit reference conductor 109 into ground 15 at uninsulated portion 115. Because current i extends substantially isotropically from reference conductor 109 into ground 15, the current passing through ground 15 between reference conductor 109 and grounding point 107 may not produce a magnetic field as understood in the art.

FIG. 1 also depicts guided wellbore 20. Guided wellbore 20 may include guided drilling string 121. Guided drilling string 121 may include guidance sensor 123. Guided drilling string 121 may also include one or more downhole tools for forming guided wellbore 20, including, for example and without limitation, drill bit 125, BHA 127. In some embodiments, guidance sensor 123 may be included in BHA 127 as shown in FIG. 1. In some embodiments, guidance sensor 123 may be included as part of a MWD system. In some embodiments, guided drilling string 121 may include one or more downhole tools having reference directions, including, for example and without limitation, a rotary steerable system, bent sub, or other tool. In certain embodiments, the radial orientation of the reference direction within guided wellbore 20 is determined. The orientation of the reference direction of the downhole tool may be referred to as the toolface of guided drilling string 121. For example, if a bent sub is included as part of guided drilling string 121, the direction of the bend may correspond with the reference direction, and the angle between the reference direction and a magnetic field defining the toolface of guided drilling string 121.

In some embodiments, guidance sensor 123 may include one or more magnetometers adapted to detect reference magnetic field B. In some embodiments, guidance sensor 123 may include a magnetometer array which may determine the magnitude and orientation of a magnetic field passing therethrough. In some embodiments, the magnetometer array may be a biaxial magnetometer array aligned such that the axes of the magnetometer array are mutually orthogonal and orthogonal to the longitudinal axis of guided wellbore 20. In some embodiments, a triaxial magnetometer array may be utilized. In some embodiments, one or more other sensors such as accelerometers may be included with guidance sensor 123 in order to make additional measurements. By determining the direction at which reference magnetic field B intersects guidance sensor 123 and the magnitude thereof, a heading and distance to reference wellbore 10 from guidance sensor 123 may be determined. By knowing the orientation of guidance sensor 123 with respect to the toolface of guided drilling string 121 and the location of reference wellbore 10 and guided wellbore 20, the direction of the toolface of guided drilling string 121 may be calculated utilizing measurements of reference magnetic field B.

For the purposes of this disclosure, an xyz coordinate system will be established, wherein the z axis is parallel to the central axis of guided drilling string 121 at guidance sensor 123. The x and y axes are defined as mutually orthogonal and orthogonal to the z axis. In some embodiments, guidance sensor 123 may include a magnetometer aligned with the x and y axes for a biaxial magnetometer or for all three of these axes for a triaxial magnetometer.

As understood in the art, the magnitude and direction of reference magnetic field B may be calculated at a point away from its source as:

$$\vec{B} = \frac{\mu_0 \vec{i} \times \hat{r}}{2\pi r}$$

where $\hat{r}$ is the heading and distance from reference wellbore 10, and $\vec{I}$ is the current and direction of current i in reference wellbore 10.

Guidance sensor 123 may take a magnetic field reading within guided wellbore 121, denoted herein as $B_{pos}$. Because guidance sensor 123 may be exposed to other magnetic fields, such as, for example and without limitation, the magnetic field of the Earth and any nearby cased wellbores or other magnetic anomalies, power supply 101 may reverse current i flowing through reference conductor 109, causing reference magnetic field B to reverse polarity. Guidance sensor 123 may take another reading of reference magnetic field B, denoted herein as $B_{neg}$. Although designated "positive" and "negative", one having ordinary skill in the art with the benefit of this disclosure will understand that the first reading may be taken with reference conductor 109 at a positive or negative polarity as long as the two readings are taken at opposite polarities of reference conductor 109. Because any magnetic fields other than B are present for both readings, by finding the difference between $B_{pos}$ and $B_{neg}$, the magnetic field values of reference magnetic field B may be isolated, according to:

$$\Delta B = B_{pos} - B_{neg}$$

In some embodiments, rather than utilizing positive and negative direct currents, power supply 101 may instead provide periodic or aperiodic alternating currents. In some embodiments, guidance sensor 123 may take a reading of reference magnetic field B with either positive or negative polarity and take a reading of magnetic fields with power supply 101 providing no current to reference conductor 109. In such an embodiment, the detected natural magnetic fields may be similarly subtracted from reference magnetic field B to isolate the magnetic field values of reference magnetic field B.

The previously described operation may be used for each of the magnetometers in guidance sensor 123. Where the x axis is aligned with the toolface of guided drilling string 121, the angle between toolface and reference wellbore 10 may be determined by:

$$\tau = \frac{\pi}{2} - \operatorname{atan}\left(-\frac{\Delta B_y}{\Delta B_x}\right)$$

because reference magnetic field B is oriented orthogonally to the vector between reference wellbore 10 and guided wellbore 20.

The calculated toolface may be referenced to, for example and without limitation, a target location, true or magnetic north, or to gravity high side can be computed by projecting the desired reference direction $\vec{q}$ into the plane perpendicular to the tool axis, as shown by:

$$\vec{q}_\perp = \vec{q} - \vec{q} \cdot \hat{z}\hat{z}$$

where $\hat{z}$ is the axis of guided drilling string 121 in world coordinates:

$$\hat{z} = \begin{bmatrix} \sin(\theta)\cos(\phi) \\ \sin(\theta)\sin(\phi) \\ \cos(\theta) \end{bmatrix}$$

where $\theta$ and $\phi$ are the inclination and azimuth of guided drilling string 121 respectively.

The offset between the $\vec{q}$ toolface and gravity toolface is given by:

$$y_q = (-q_{\perp y}/q_{\perp x})$$

and the connection between any toolface references can be computed thereby. For example, in the case that reference wellbore 10 and guided wellbore 20 are vertical, with the guided wellbore placed at a heading of $\xi$ from true north, the correction to a north-referenced azimuthal toolface is given by:

$$\gamma = \xi + \frac{\pi}{2}$$

In some embodiments, the distance and heading to reference wellbore 10 may be computed by standard methods. This heading may be used as a toolface for guided drilling string 121, defining an artificial toolface or artificial magnetic toolface. However, as understood in the art, a single measurement of reference magnetic field B cannot simultaneously determine both direction and toolface. In some embodiments, a gradient magnetic field measurement may resolve this ambiguity as can a relative displacement in the horizontal plane.

In some embodiments, the direction determination may be improved by including a more detailed geometry of reference wellbore 10, the surveyed geometry of ground lead 103, and the resistivity of ground 15 in the model of reference magnetic field B. The field at the position of guidance sensor 123 may be computed by integrating the Biot-Savart law in differential form over all the power supplies.

In some embodiments, the location of ground point 107 may be selected such that it is in the opposite direction from reference wellbore 10 as guided wellbore 20. By using such an arrangement, any magnetic field generated in ground lead 103 may be parallel to reference magnetic field B. The above described distance measurement may be modified to account for any additional magnetic field therefrom. In some embodiments, the effect of any magnetic field generated in ground lead 103 may be accounted for in the magnetic model as discussed herein above by knowing the location of ground point 107.

In some embodiments, power supply 101 may supply an AC waveform to ground lead 103 and reference lead 105. In some embodiments, power supply 101 may provide switched DC current to ground lead 103 and reference lead 105. In some embodiments, multiple reference wells 10 having artificial toolface reference systems 100 may be positioned about guided wellbore 20. In some such embodiments, each artificial toolface reference system 100 may be actuated in sequence or simultaneously.

When comparing $B_{pos}$ and $B_{neg}$ or the magnetic field determined with power supply 101 turned off, rotation of guided drilling string 121 between measurements may cause error in the calculated toolface. In some embodiments, one or more accelerometers may be used to determine a gravity toolface to determine whether guided drilling string 121 has rotated. However, when in a substantially vertical well, accelerometer derived gravity toolface data may be subject to significant error such as quantization error due to the low inclination angle of guided wellbore 20. The artificial magnetic toolface is not usable for this purpose, as reference magnetic field B causes different values for the determined magnetic toolface when power supply 101 provides positive, negative, or no current.

In some embodiments, such as if the gravity toolface indicates that a rotation has occurred between measurements, a second set of measurements may be taken with power supply 101 providing positive, negative, or no current, referred to herein as a positive shot, negative shot, and neutral shot respectively, to match the first set of measurements. The determined magnetic toolface based on the second positive shot may be compared with that determined from the first positive shot, that of the second negative shot with the first negative shot, and that of the neutral shot with the first neutral shot. By determining the difference therebetween, it can be determined whether any rotation of guided drill string 121 occurred between measurements. One having ordinary skill in the art with the benefit of this disclosure will understand that although discussed with respect to accelerometers and gravity toolface, other sensors may be used to identify movement of the tool including, for example and without limitation, one or more gyros to determine a gyro toolface.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An artificial toolface reference system comprising:
   a power supply, the power supply providing current to a ground lead and a reference lead;
   a ground point, the ground point coupled to the ground lead and in electrical connection with the ground;
   a reference wellbore;
   a reference conductor positioned within the reference wellbore, the reference conductor including a length or string of tubing, a length or string of casing, a liner, a drill pipe, drill collars, or pup joints, the reference conductor in electrical connection with the reference lead, the reference conductor having an insulated portion and an uninsulated portion, the uninsulated portion in electrical connection with the ground, the insulated portion having an insulating layer positioned thereabout; and
   a guidance sensor positioned outside the reference wellbore including at least one magnetometer.

2. The artificial toolface reference system of claim 1, wherein the power supply provides an electric current which passes through the reference lead, the reference conductor, the ground, the grounding point, and the ground lead.

3. The artificial toolface reference system of claim 1, wherein the guidance sensor is included in a guided drilling string positioned within a guided wellbore, the guided drilling string including a tool having a reference direction, the angle between the reference direction and the reference wellbore defining a toolface.

4. The artificial toolface reference system of claim 3, wherein the guidance sensor comprises a magnetometer array, and the offset between the reference direction and the axes of the magnetometer is known.

5. The artificial toolface reference system of claim 1, wherein the power supply provides one or more of an AC source or a switched DC source.

6. The artificial toolface reference system of claim 1, wherein the insulating layer is applied to the reference conductor by one or more of spraying, brushing, dipping, electrostatic deposition, wrapping, casting, or extruding.

7. The artificial toolface reference system of claim 1, wherein the insulating layer is formed from an electrically insulating material.

8. The artificial toolface reference system of claim 7, wherein the insulating layer is formed from one or more of a plastic, rubber, ceramic, mineral, composite, or varnish.

9. The artificial toolface reference system of claim 8, wherein the insulating layer is formed from one or more of acrylonitrate butadiene styrene (ABS), an acetate, an acrylic, an acetyl resin, polyamide film, fluoropolymer, polycarbonate, aromatic polyamide, nylon, polyethylene terephthalate, phenolic, epoxy, polyester, polyolefin, polystyrene, polyurethane, polyvinylchloride, polytetrafluoroethylene, thermoplastic, polysulfone, polyetherimide, polyamide-imide, or polyphenylene.

10. The artificial toolface reference system of claim 8, wherein the insulating layer is formed from one or more of neoprene rubber or silicone rubber.

11. The artificial toolface reference system of claim 1, wherein the uninsulated portion is positioned at a lower end of the reference conductor.

12. The artificial toolface reference system of claim 1, wherein the reference lead is coupled to the reference conductor at the surface.

13. The artificial toolface reference system of claim 1, wherein the reference lead is coupled to a centralizer.

14. The artificial toolface reference system of claim 1, wherein the reference lead is electrically coupled to the reference conductor by a conductive fluid.

15. The artificial toolface reference system of claim 1, wherein the insulating layer electrically insulates an outside surface of the reference conductor from the reference wellbore.

16. The artificial toolface reference system of claim 1, wherein the insulating layer extends from the surface to the uninsulated portion.

17. The artificial toolface reference system of claim 1, wherein the reference conductor is the string of tubular.

18. The artificial toolface reference system of claim 1, wherein the ground point is a conductor in electrical contact with seawater.

19. The artificial toolface reference system of claim 1, wherein the magnetometer is aligned such that the axes of the magnetometer are mutually orthogonal and orthogonal to a longitudinal axis of the wellbore.

20. A method comprising:
   forming a reference conductor, the reference conductor having an insulated portion and an uninsulated portion, the insulated portion having an insulating layer positioned thereabout;
   positioning the reference conductor in a reference wellbore such that the uninsulated portion of the reference conductor is in electrical connection with the ground;
   coupling a power supply between a ground point and the reference conductor, the ground point positioned a distance away from the reference conductor and in electrical communication with the ground;

providing a current, with the power supply, through the reference conductor, the ground, and the ground point such that a reference magnetic field is generated along the reference conductor; and measuring the reference magnetic field with a magnetometer positioned outside of the reference wellbore.

21. The method of claim 20, wherein the measuring of the reference magnetic field is carried out by a guidance sensor including at least one magnetometer.

22. The method of claim 20, wherein forming the reference conductor comprises spraying, brushing, dipping, electrostatically depositing, wrapping, casting, or extruding the insulating layer about the reference conductor.

23. The method of claim 20, wherein the insulating layer is formed from an electrically insulating material.

24. The method of claim 23, wherein the insulating layer is formed from one or more of a plastic, rubber, ceramic, mineral, composite, or varnish.

25. The method of claim 23, wherein the insulating layer is formed from one or more of acrylonitrate butadiene styrene (ABS), an acetate, an acrylic, an acetyl resin, polyamide film, fluoropolymer, polycarbonate, aromatic polyamide, nylon, polyethylene terephthalate, phenolic, epoxy, polyester, polyolefin, polystyrene, polyurethane, polyvinylchloride, polytetrafluoroethylene, thermoplastic, polysulfone, polyetherimide, polyamide-imide, or polyphenylene.

26. The method of claim 23, wherein the insulating layer is formed from one or more of neoprene rubber or silicone rubber.

27. The method of claim 20, further comprising:
determining a magnitude of the reference magnetic field measured by the magnetometer; and
determining a distance between the magnetometer and the reference conductor.

28. The method of claim 20, wherein the magnetometer is a biaxial or triaxial magnetometer, and the method further comprises:
determining a direction at which the reference magnetic field intersects the magnetometer; and
determining a heading between the magnetometer and the reference conductor.

29. The method of claim 20 further comprising positioning the ground point at a distance from the reference conductor such that a current leaves the reference conductor in a substantially isotropic manner.

30. The method of claim 20, wherein the step of measuring the magnetic field comprises:
taking a first magnetic field reading, defined as $B_{pos}$;
reversing the current;
taking a second magnetic field reading, defined as $B_{neg}$; and
isolating the magnetic field values of a reference magnetic field according to $$\Delta B = B_{pos} - B_{neg}.$$

31. The method of claim 20 further comprising determining the toolface of a drilling string.

32. The method of claim 20 further comprising determining a gradient magnetic field measurement.

33. The method of claim 20 further comprising determining rotation of a drill string using the magnetometer.

* * * * *